US006934673B2

(12) United States Patent
Alvarez et al.

(10) Patent No.: US 6,934,673 B2
(45) Date of Patent: Aug. 23, 2005

(54) METHOD AND APPARATUS FOR PREDICTING MULTI-PART PERFORMABILITY

(75) Inventors: Guillermo Alvarez, San Jose, CA (US); Ralph Becker-Szendy, Los Gatos, CA (US); Arif A. Merchant, Los Altos, CA (US); Mustafa Uysal, Mountain View, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 632 days.

(21) Appl. No.: 09/865,999

(22) Filed: May 25, 2001

(65) Prior Publication Data

US 2002/0177989 A1 Nov. 28, 2002

(51) Int. Cl.[7] .................. G06F 13/10; G06F 13/12; G06F 17/10; G06F 7/60
(52) U.S. Cl. .................. 703/21; 703/2; 703/20; 714/44; 714/47; 702/179; 702/182; 702/186
(58) Field of Search .................. 703/2, 20, 21, 703/22, 24, 25, 13, 27; 714/44, 47, 48; 702/179–181, 182–186

(56) References Cited

U.S. PATENT DOCUMENTS

| | | | | |
|---|---|---|---|---|
| 5,421,004 A | * | 5/1995 | Carpenter et al. | 714/25 |
| 5,522,014 A | * | 5/1996 | Clark et al. | 706/45 |
| 5,537,644 A | * | 7/1996 | Hamilton et al. | 706/52 |
| 5,822,218 A | * | 10/1998 | Moosa et al. | 716/4 |
| 6,249,887 B1 | * | 6/2001 | Gray et al. | 714/47 |
| 6,735,549 B2 | * | 5/2004 | Ridolfo | 702/181 |
| 6,771,440 B2 | * | 8/2004 | Smith | 360/31 |

OTHER PUBLICATIONS

Alverez et al., Declustered Disk Array Architectures with Optimal and Near–optimal Parallelism, IEEE 1998.*
Mitchell et al., A Reliability Model Combining Representative and Directed Testing, IEEE, 1996.*
Huang et al., A Speculation–Based Approach for Performance and Dependability Analysis: A Case Study, ACM 1998.*
Guillermo A. Alvarez et al., Declustered Disk Array Architectures with Optimal and Near–optimal Parallelism, Proc. of the 25th Annual ACM/IEEE Symposium on Computer Architecture, 1998, pp. 109–120, IEEE Computer Society, Washington DC.
Guillermo A. Alvarez et al., Efficient verification of performability guarantees, Fifth International Workshop on Performability Modeling of Computer and Communication Systems, Sep. 2001, Erlangen, Germany.

(Continued)

*Primary Examiner*—W. Thomson (57) ABSTRACT

A method of and apparatus for determining whether a multi-component target system meets a given multi-part performability requirement is provided. A description of the target system, failure probabilities for components of the target system and a multi-part performability requirement for the target system are obtained. The multi-part performability requirement indicates desired performance levels and corresponding fractions of time. One or more failure-scenarios are successively computed that represent one or more states of the target system having zero or more components failed and a corresponding probability of occurrence of the one or more of the states of the target system. Performance of the target system is modeled under the failure scenarios using a performance predictor module for generating a multi-part performability function. The multi-part performability function is compared with said multi-part performability requirement to determine whether the target system meets the multi-part performability requirement.

26 Claims, 5 Drawing Sheets

OTHER PUBLICATIONS

Scott A. Barnett et al., Performability of disk–array–based video servers, Multimedia Systems, 1998, 6:60–74, Springer–Verlag, Berlin, Germany.

Ing–Ray Chen, Effect of Probabilistic Error Checking Procedures on Performability of Robust Objects, Proceedings of the 1993 ACM/SIGAPP Symposium on Applied Computing: States of the Art and Practice, 1993, pp. 677–681, ACM Press, New York, NY.

S. M. Rezaul Islam, Performability Analysis of Disk Arrays, Proceedings of the 36th Midwest Symposium on Circuits and Systems, 1993, IEEE, New York, NY.

Edward K. Lee et al., An Analytic Peformance Model of Disk Arrays, Proceedings of the 1993 ACM SIGMETRICS Conference on Measurement and Modeling of Computer Systems, 1993, pp. 98–109, ACM Press, New York, NY.

Arif Merchant et al., Analytic Modeling of Clustered RAID with Mapping Based on Nearly Random Permutation, IEEE Transactions on Computers, 1996, vol. 45, No. 3, pp. 367–373, IEEE Computer Society, Washington DC.

Arif Merchant et al., Disk Array Models in Minerva, HP Labs Technical Report, HPL–2001–118, May 15, 2001, Hewlett–Packard, Palo–Alto, CA.

David A. Patterson et al., A Case for Redundant Arrays of Inexpensive Disks (RAID), Proceedings of the 1988 ACM SIGMOD International Conference on Management of Data, 1988, pp. 109–116, ACM Press, New York, NY.

Alexander Thomasian et al., Performance Analysis of RAIDS Disk Arrays with a Vacationing Server Model for Rebuild Mode Operation, Proceedings of the Tenth International Conference on Data Engineering, 1994, pp. 111–119, IEEE Computer Society, Washington DC.

Alexander Thomasian et al., RAIDS Performance with Distributed Sparing, IEEE Transactions on Parallel and Distributed Systems, 1997, vol. 8, No. 6, pp. 640–657, IEEE Computer Society, Washington DC.

Alexander Thomasian, RAIDS Disk Arrays and their Performance Analysis, Recovery Mechanisms in Database Systems, 1997, Chapter 37, Prentice–Hall, Upper Saddle River, NJ.

John Wilkes et al., Specifying data availability in multi–device file systems, Technical Report HPL–CSP–90–6, 1990, Hewlett–Packard, Palo Alto, CA.

* cited by examiner

METHOD AND APPARATUS FOR PREDICTING MULTI-PART PERFORMABILITY

BACKGROUND OF THE INVENTION

1. Field of the Invention

The present invention relates generally to predicting a combined performance and availability characteristic of complex systems—the combination referred to hereinafter as "performability". More specifically, the present invention relates to making efficient, computerized predictions of the performability of systems composed of components that can fail independently of one another. More particularly, the present invention includes a method and apparatus for determining whether a predetermined multi-component system can meet target performability requirements. An exemplary embodiment is described for predicting multi-part performability of a predetermined, complex, multi-component, data storage system.

2. Description of the Related Art

Systems composed of many parts that can fail independently are commonplace. Consider the simple example of a school bus system that uses a number of different buses of different capacities; each bus can break down, independently of the others. Almost all such systems have desired performance goals. In the example, it might be that all the students be brought to school at the start of the school day in time for the first class.

It is natural to want such systems to be able to provide full service all the time, but it is usually too expensive to ensure this. In such circumstances, people are usually willing to live with a lower level of performance for a certain period, in order to reduce the overall cost of the system. In the example, a school district might be able to afford a spare bus or two—but it would be unlikely to be able to keep a complete spare fleet of buses. Even if there were plenty of spare buses, if a bus failed on its rounds, some of the students might have to wait for a replacement bus to arrive, and so be late. It might even be acceptable for no bus to be available for a day or two if alternative mechanisms existed to get the students to school.

In general, in a system that can exhibit partial failures, the performance of the system with one or more partial or complete component failures is often lower than when the system is completely failure-free. The term "performability of a system" describes the resulting set of performance levels achieved (perhaps under some load) and the fractions of time that the system achieves them (as a result of partial or complete component failures). The performability of a system can be represented as a set of pairs "(r,f)", where each "r" represents a performance level, and each "f" the fraction of time that performance "r" is achieved or bettered. It is common to include pairs for both "full performance" and "no performance" in the specification.

Performability can be predicted, or actually achieved (or measured) in practice. "Performability requirements" are target goals for the performability of a system, and "performability specifications" are written versions of performability requirements. Similarly, a "performability function" is a representation of a performability requirement (or measurement or prediction). It is sometimes shown as a "performability curve", which is a graphical rendering of the function. Performability requirements (or measurements or predictions) consist, by the previous definitions, of multiple parts; each different combination of the performance and the availability represents a different part. In what follows, we sometimes use the term "multi-part" without loss of generality, to bring this fact to the attention of the reader.

A system "meets (or satisfies, or performs, or fulfills) its performability requirements" (or "is predicted to . . .") if the achieved (or predicted) performability of the system is at least as good as the performability requirement for it. An object of this invention is to provide a faster way to calculate whether this is the case.

In the example above, the ideal performance requirement is "all students get to school on time, every school day". But, given data on the rate at which school buses fail, and the costs of having standby buses, the school district is likely to accept a lower level of performance as long as the lower performance (fewer students on time) does not happen too often and does not last too long. Thus, the requirements for the school bus service for this example might read as follows (in part):

"Ideally, all 3000 students will get to school on time, every school day.

It is acceptable for up to 40 students to be delayed by 15 minutes, as long as this does not happen more than 14 days a year.

It is acceptable for up to 20 students to be delayed by as much as an hour, as long as this does not happen more than on 7 days a year, provided that each occurrence affects no more than 3 consecutive school days.

And, at most once a year, it is acceptable that schools close for one or two days if too many buses all fail at the same time."

These requirements combine performance (how many students get to school when) with availability (the likelihood of a given number of students arriving on time). A performability specification may contain or imply a "workload" as part of its performance specifications (the number of students in this example), but not need do so.

The performability specification is a concise way to cope with the fact that the average performance over a system's lifetime is often not a useful metric for many target-system designers. Even with all the data at hand, it is often difficult to work out whether a particular system design is going to be able to meet a performability specification. For example:

(a) the number of failure scenarios can be very large, and may have to encompass multiple concurrent failures, not just one failed component at a time; furthermore, each component may have different performance and failure characteristics: so it may not be enough simply to predict the effects of a single "representative" example failing;

(b) it may be expensive or difficult to predict the performance or likelihood of each failure scenario; and (c) the performability specifications may themselves be complicated.

Each of these issues will be discussed briefly below.

(a) The number of failure scenarios can be very large. In the example system, assuming 100 buses in the fleet, there are 100 different cases of a single bus failing that need to be analyzed. Each combination of possible failures—including the special case of no failures—is a separate "failure scenario". Analyzing 101 different failure scenarios is not too hard using a computer. But if the school buses fail often enough that there is a reasonable chance that two of them will be out of service, the number of combinations increases dramatically—to approximately 100 times 100 cases, or about 10,000. Coping with a third failed bus may involve almost 1 million failure scenarios to analyze. And each bus may have its own, distinct failure mechanisms (for example, one might be have a petrol engine, and another a diesel engine).

There are, of course, systems that are much larger still. For example, some computer storage systems may contain thousands of components. The number of failure scenarios grows exponentially as a function of the number of components in the system, and of the number of concurrent failures it can tolerate while still remaining "functional." For example, if a computer storage system with 10,000 data storage disks could tolerate a maximum of two disk failures, then it would be necessary to evaluate its performance in each of 100,000,000 different failure scenarios.

(b) It may be expensive or difficult to predict the performance or likelihood of each failure scenario. A "target system" being designed may be very complicated, the workloads may be very complicated, the components may themselves be complex systems, the models used to predict performance may be very complicated, slow, or difficult to use, or some combination of these, may all be relevant to performability. Analysis is even more difficult if different components have different failure rates or performance characteristics. Returning to the simple example system, a fleet may consist of different kinds of school buses, each with its own failure rate, speed, and capacity.

(c) The performability specifications may themselves be complicated. In the school bus example above, the number of students was constant; but it could also be the case that the number varies; perhaps the school population fluctuates at different times of year, or perhaps the number of students trying to get to school drops in very cold weather, at precisely the time when buses are more likely to break. Such complications make the problem of determining whether a given design (in this case, the number and type of buses) will meet its performability specification even more difficult.

In computer storage systems, the workload may be very complicated indeed: it is necessary to describe dozens of pieces of information about each portion of the workload to be able to predict accurately its performance.

The number of possible combinations of different types of workload is effectively extremely large.

Therefore, there is a need for a computerized system that can determine, economically and efficiently, whether a given complex system design meets a given performability specification.

3. Problem Statement: (Applied to an Exemplary Data Storage System).

This invention is especially suited for assisting with the design of multi-component computer-based systems (for brevity, generally referred to hereinafter merely as "systems" in the context of this document). Such systems typically comprise a collection of one or more data processing, communication, and storage components. The design, configuration, and maintenance of such computer systems is difficult. There is a need to predict the behavior of the systems in a novel manner such that many system design problems will be alleviated, including problems such as: allowing systems that were installed to meet their requirements more often; reducing the cost of systems, because there would be less need for expensive over-design; and reducing the number of emergency repair and preemptive maintenance calls by having a good understanding about which particular failures are relatively benign.

Generally, and as will be described in more depth hereinafter with respect to an exemplary embodiment, complex systems, such as those comprising hundreds and thousands of computers and attendant mass data storage apparatus, create complex problems regarding selection, configuration, and maintenance for system designers and information technology system administrators. The purchase and maintenance of such systems are expensive costs of doing business. Pre-purchase configuring of such systems and modeling performance without building prototypes is a complex task due to the nearly infinite number of possible workloads and system configurations.

Figure 1:
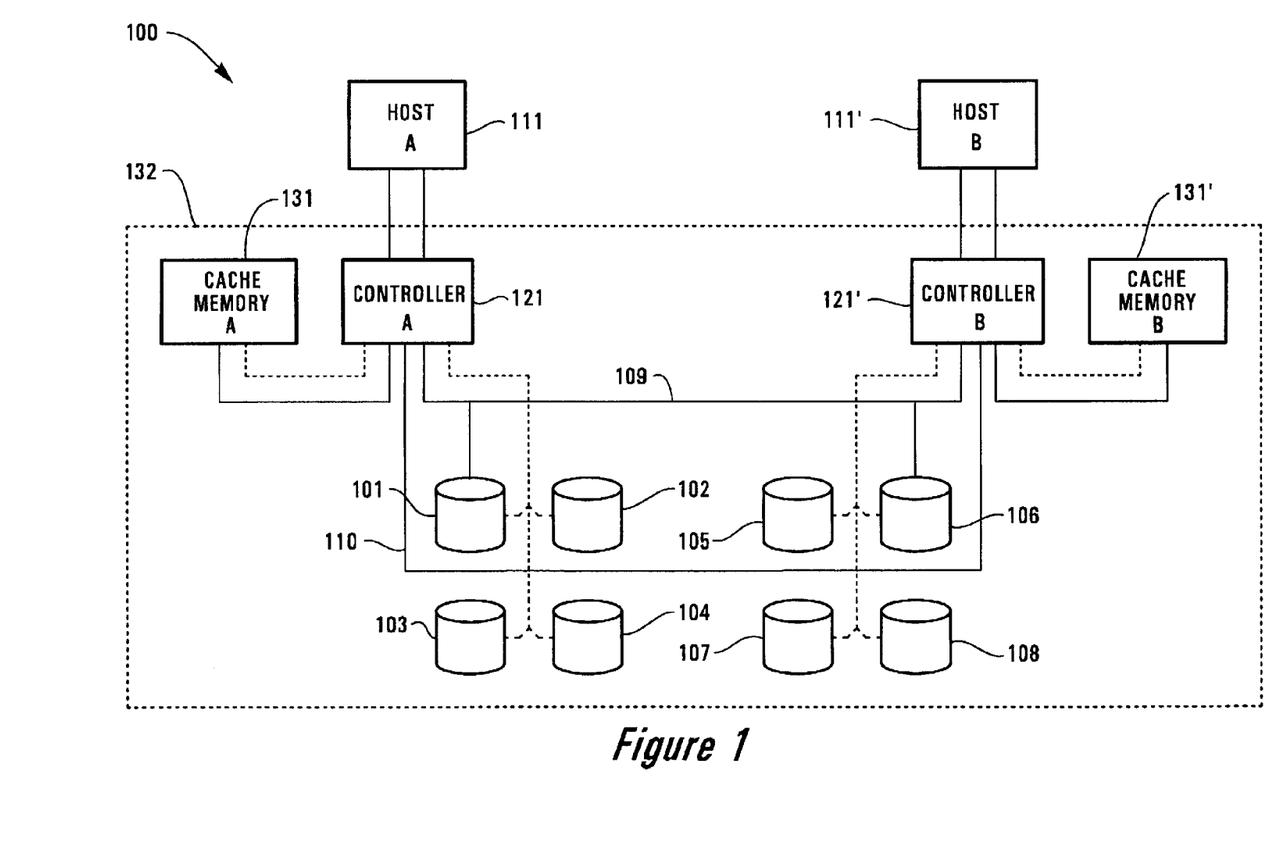
FIG. 1 is a schematic block diagram that depicts an exemplary computer system including a disk array for its data storage subsystem.

As shown in FIG. 1, a representative system used hereinafter as an exemplary embodiment for discussion of the present invention, the target system 100 is a relatively small computer system having a disk array 132. We describe the invention in the context of a performability analysis of the data storage subsystem. No limitation on the scope of the invention is intended by the inventors nor should any be implied from the use of this example.

As an example of how the system 100 of FIG. 1 may be used, consider a health maintenance organization (HMO) where host A 111 processes patient records data while host B 111' processes provider and employer/employee data. Storage requirements for profiling thousands of patients records and provider records and employer/employee information may require a storage capacity of hundreds of gigabytes (GB), or even more than a terabyte (TB), for the associated data. Based on the currently available hardware technology, such a system 100 for the HMO might require seventy disk drives and ten controllers.

The data storage subsystem of the system 100 includes the disk array 132. The disk array 132 typically contains several disk drives 101–108 to store data, one or more controllers 121, 121' both to communicate with the clients (host computers 111, 111') and to control the operation of the disk array, one or more data caches 131, 131' to hold stored data temporarily in a manner that is very fast to access, thereby improving performance, and appropriate buses 109 or other interconnections to join these components together. Other, associated components such as device drivers, disk array firmware, and modules that implement basic functions in the data path (e.g., parity calculation engines, direct memory access engines, busses, bus bridges, communication adapters for busses and external networks, and the like, not shown) are also part of a typical data storage subsystem.

There are many different designs of disk arrays, but most of them share one common trait: they are intended to increase the likelihood that data stored in them will survive the failure of one or more of the disk array's components. Because of this, such disk arrays are often used for large data storage and management applications, often storing very critical data.

The basic approach to achieving acceptable partial failure modes of operation is to provide redundancy—the provision of more components than strictly needed to accomplish the basic function. A redundant array of inexpensive disks ("RAID") is often used for large data storage and management applications (slower, high capacity, tape drive arrays and optical disk drive apparatus can be employed similarly). RAID was first popularized by researchers at the University of California, Berkeley: see e.g., D. Patterson, G. Gibson and R. Katz, *A Case for Redundant Arrays of Inexpensive Disks (RAID)*, Proceedings of the 1988 SIGMOD International Conference on the Management of Data, Chicago, Ill., May 1988. These RAID ideas were initially only applied to the disk drives in a disk array, whereas, it is important to realize that true failure scenarios affect the other data storage subsystem components (namely, all of FIG. 1 excluding the Host A 111 and Host B 111' computers). In one mode of RAID operation, multiple copies of the stored data are kept, each copy on a different disk drive. This is often referred to as "RAID 1 mode", or "mirroring". Although this increases the number of disk drives needed, it also increases the availability of the data; if one disk drive breaks, another is there to provide a copy of the data. Other RAID modes allow for partial redundancy: these provide failure tolerance at lower cost, but with a more significant performance degradation after a failure and during certain normal-mode input/output ("IO") operations.

Data inside the array is spread out onto what is referred to in the art as Logical Units ("LUs"), sometimes referred to as "LUNs" for Logical Unit Numbers, which are the names by which LUs are known. Each LU represents a subset of the total storage space available in the array, and is an aggregation of disk drives into a single logical construct, visible to the host computers that use the array. Each LU is used and managed independently of the other LUs. Typically, LUs can be constructed from any aggregation of the disk drives accessible to a controller inside an array. In the FIG. 1, four disk drives 101, 102, 103, 104 are grouped into one such LU, and the remaining disk drives 105, 106, 107, 108 into another. (It is also common in the art to say that the LU is "placed on" the disk drives.) Data flow is indicated generally by phantom lines, demonstrating that in the example system shown in the FIG. 1, host computer A 111 uses the LU on disk drives 101, 102, 103, 104, and host computer B 111' uses the LU on disk drives 105, 106, 107, 108.

The introduction of redundancy in disk arrays—that is primarily present to handle component failures—raises several issues about performance, including:

(a) although it may be possible to continue operation after a failure, the performance of the system usually degrades in this state;

(b) even in failure-free mode, data replication can improve performance (e.g., if two disks contain identical copies of the same data, it is possible to read it from the disk that is less busy to improve performance), or hurt it (e.g., with two copies, an update has to be sent to both before the operation is completed, and that takes longer than simply updating one copy); and (c) when failures are being repaired, recovery may impact performance: for example, after a disk drive has failed, the system will begin rebuilding its contents on a spare disk drive, so accesses originated by the reconstruction task compete with normal accesses.

The workloads processed by computer storage systems are often themselves very complicated, requiring a great many parameters to characterize them accurately. Small variations in such workloads can sometimes have large effects on the performance and cost of the associated storage systems. In the system 100 of FIG. 1, a workload can be defined by the stream of IO requests (READ and WRITE commands) issued by hosts A 111 and B 111' to the disk array. The workload can be characterized by parameters such as the typical IO request size, and the rate at which such requests are generated. But this is not enough to predict the performance of the storage subsystem of FIG. 1 accurately. To do so involves including many other workload characteristics, such as the amount of the workload that can be cached in cache memories 131 and 131', the degree of sequential accesses to the on-disk data, and in some circumstances, correlations in the access patterns between the two hosts 111, 111'. Each of these can have a significant impact on the performance and cost of the storage system needed to meet the needs of the workload.

Developing designs for such systems is hard enough when failures are not taken into account. There are many published papers on estimating the performance characteristics of disk arrays. One example is the paper by Lee and Katz on *An Analytic Performance Model of Disk Arrays*, published in the proceedings of the ACM SIGMETRICS conference, May 1993 (pages 98–109).

Since a primary reason for deploying disk arrays is to support continued operation in the presence of failures, it is often very important to be able to predict the performability of the system under the range of failures that the system is likely to encounter in practice. Doing so with manual techniques is slow, error-prone, and unlikely to be satisfactory. It also suffers from all of the problems outlined above.

4. Description of the Prior Art

Given the complexity of designing and managing large computer systems, system designers rely on very simple rules of thumb to make design, configuration and purchase decisions. This can lead to systems that do not satisfy their performance expectations, or to excessive system cost due to over-design, or both.

A common approach is to build an actual, test system for a proposed workload in order to evaluate system performance empirically. Although this is often time consuming, hard to do, and expensive, it is nonetheless often the method employed by a system supplier to demonstrate the viability of a proposed system to a potential customer. Because of the difficulty of working with such systems, it is rare to explore even simple failure modes because doing so is expensive, time consuming, and may not even be possible.

Another technique in the prior art is to predict the performance of storage devices with a performance model, such as that described in the paper by Lee and Katz on *An Analytic Performance Model of Disk Arrays*. This approach is not a complete multi-part performability analysis as defined herein because it fails to take into account the multi-part performability requirements that are the essence of this invention. It is hard to predict the performance of a single configuration using these tools, let alone explore hundreds or thousands of failure scenarios.

Moreover, average performance over the system's lifetime is not a useful metric for many target-system designers.

There is a need for a more realistic metric for the suitability of a given system for a given task. Such a metric comes from putting together the concepts of availability and performance, during both failure-free and degraded modes of operation under a given workload.

Prior solutions generally treat the failure analysis of complex systems as Markov chain reward models or Petri net models. These methods work best when predicting whether a system meets a single-part performability specification, for example, the average bandwidth available in a disk array, taking into account the possibility of disk component failures. See e.g., S. M. Rezaul Islam, *Performability Analysis of Disk Arrays*, Proceedings of 36$^{th}$ Midwest Symposium on Circuits and Systems, Detroit, Mich., Aug. 16–18 1993, pp. 158–160, IEEE Publications; Ing-Ray Chen, *Effect of Probabilistic Error Checking Procedures on Performability of Robust Objects*, Proceedings of 8$^{th}$ ACM/SIGAPP Symposium on Applied Computing, Indianapolis, Ind., Feb. 14–16 1993, pp. 677–681, ACM Publications. Both of these papers use a different definition of performability than we do. They represent the system as a Markov chain and associate a single-valued "reward" with each state in the Markov chain. They compute the expected value of this reward based on all the state probabilities. Our definition of performability is multi-part; it does not require that the underlying system be modeled as a Markov chain, and we do not require all state probabilities to be calculated.

None of the above approaches provides an efficient, effective, high-quality prediction of whether a target system will meet its performability goals.

Thus, given a description of a complex system, and the performability requirements of the end-user or target-system designer, there is a need for a method and apparatus to provide a multi-part performability assessment as to whether the candidate system meets the requirements.

SUMMARY OF THE INVENTION

In general, the present invention provides a method and apparatus for calculating whether or not a target system will be able to meet its performability goals. The method uses a failure-scenario generator, a performance predictor, and a performability evaluator to perform this analysis.

In its basic aspects, the present invention provides a method of determining a multi-component target system performance capability with respect to a set of multi-part performability requirements, the method including: operating on a representation of the target system, providing a first failure-scenario analysis of said target system; generating a multi-part performability function of said target system using said first failure-scenario analysis; comparing said multi-part performability function with said set of multi-part performability requirements; and determining from said comparing whether said target system meets said multi-part performability requirements.

In another aspect, the present invention provides a computer memory including: computer code operating on a representation of the target system, providing a first failure-scenario analysis of said target system; computer code generating a multi-part performability function using said first failure-scenario analysis; computer code comparing said multi-part performability function with said multi-part performability requirements; and computer code determining from said comparing whether said target system has a capability of performing said multi-part performability requirements.

In another aspect, the present invention provides a method of doing business of verifying performability of a target system having predetermined components and predetermined multi-part performability requirements, the method including: using a computer, (1) operating on a representation of the target system, including providing a failure-scenario analysis of said target system; (2) generating a multi-part performability curve using said failure-scenario analysis; (3) comparing said requirements with said curve; (4) determining from said comparing whether said target system has the capability of performing said multi-part performability requirements; and (5) generating a report indicating of results whether said target system has the capability of performing said multi-part performability requirements.

The foregoing summary is not intended by the inventors to be an inclusive list of all the aspects, objects, advantages, or features of the present invention nor should any limitation on the scope of the invention be implied therefrom. This Summary is provided merely to apprise the public, and more especially those interested in the particular art to which the invention relates, of the basic nature of the invention in order to be of assistance in aiding ready understanding of the patent in future searches. Specific aspects, objects, advantages, and features of the present invention will become apparent upon consideration of the following explanation and the accompanying drawings, in which like reference designations represent like features throughout the drawings.

DESCRIPTION OF THE PRESENT INVENTION

Reference is made now in detail to a specific embodiment of the present invention that illustrates the best mode presently contemplated by the inventors for practicing the invention. Alternative embodiments are also briefly described as applicable. The sub-headings provided in this document are merely for the convenience of the reader; no limitation on the scope of the invention is intended nor should any be implied therefrom.

For the purpose of this invention, whatever the nature of the actual system being analyzed, the performability requirements must be definable in a way that is comprehensive enough to capture all relevant parameters and is computer-readable. It is desirable—but not necessary—for these descriptions to be compact and understandable enough to be manipulated by both end users and target-system designers. What follows is an English-language version of a sample performability description for the previous example system 100:

For LU #1, the best-case performance of the system shall at least meet the following specification: a capacity of 5 Gigabytes; an average request rate of 100 IO/s (IO operations per second); a mean IO request size of 32 Kilobytes; and 70% of the accesses will be to sequential addresses.

During times of partial failure, the system shall support at least 50 IO/s for at least 40% of the time, and it shall support at least 10 IO/s for at least another 40% of the time. During these times of degraded performance, the remainder of the performance specification (capacity, request size, sequentiality) remains the same as above.

The system shall be completely non-functional for no more than 20% of the time.

Thus, a specific multi-part performability requirement is now defined as an expressible set of end-user or target-system designer-defined minimal criteria that the system under study must satisfy, where the expression is adapted to a computerized process for predicting performability of that system.

The processes presented with respect to this invention also require a computer-readable system description that contains information about the components of the system, their interconnections, and their performance and dependability characteristics (e.g. bandwidth, capacity, and failure modes and failure mode and repair rates).

Basic Operation

In the main, the present invention provides a method and apparatus for determining whether a target system configuration (e.g., as exemplified in FIG. 1) satisfies a given system performability requirement. That is, the system must provide given minimum levels of performance during given fractions of its operational lifetime.

The invention operates by generating failure scenarios for the system configuration and predicting the system's performance for each of them. Each successive prediction is incorporated into a set of system states that have been so evaluated. As soon as a decision can be made about whether the system satisfies the requirements, or it does not, the multi-part performability assessment process is halted and the assessment results reported. The present invention may be implemented in software, or firmware, or a combination of both.

In order to describe the present invention, an exemplary embodiment employing graphical analysis is presented. It will be recognized by those skilled in the art that this graphical representation is merely one form of analysis and that others may be employed within the scope of the invention as defined in the claims; no limitation on the scope of the invention is intended nor should any be implied.

Figure 2:
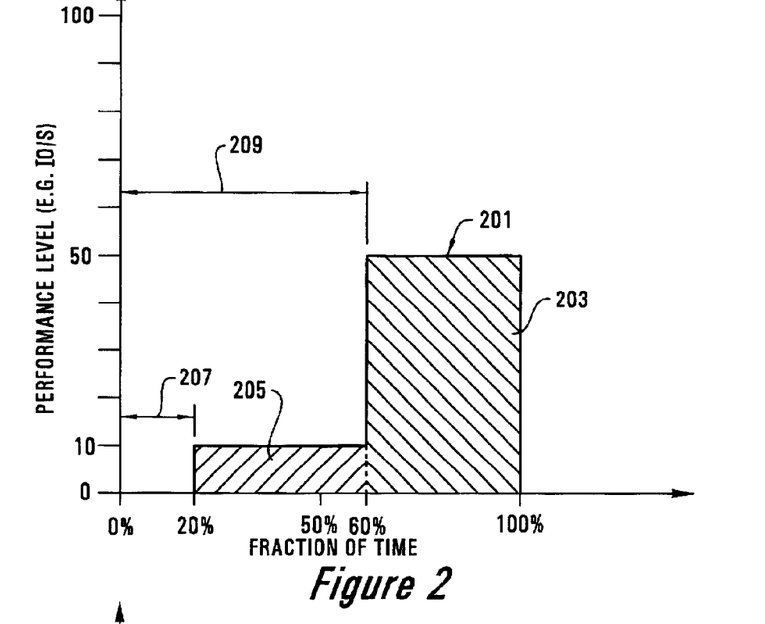
FIG. 2 is an exemplary graph depicting target-system designer predetermined performability requirements.

FIG. 2 is a graph exemplifying a very simple, predefined, multi-part performability requirement. The target-system designer has specified, as a system function here represented by "requirements curve" 201, that the system be available 40% of the time at a predetermined performance level of at least 50 IO/s, represented as the hatched area 203 below the requirements curve 201, and at least at 10 IO/s for 40% more of the time, represented as the banded area 205 below the curve 201, and can be completely down no more than 20% of the time, region 207. This equates to allowing less than 50 IO/s for less than 60% of the time, region 209, and less than 10 IO/s for less than 20% of the time, region 207. It should be recognized by those skilled in the art that this exemplary requirements curve 201 is in essence any function representative of a set of performance levels versus percentage of time at each of said performance levels.

More precisely, we denote a system's condition regarding component failures by its state, denoted $S_i$: each state represents a particular combination of components that have failed. We refer to the set "S" that contains all "M" possible system states as:

$$S = \{S_1, S_2, S_3, \ldots S_M\} \quad \text{(Equation 1)},$$

"M" can be a very large number. Associated with each state "$S_i$," where "i"=1 through "M", in the set "S" is a probability "$OP(S_i)$" of the system being in that state, and a performance "$U(S_i)$" that the system demonstrates while in that state "$S_i$". A "failure scenario" $sc_i$ is a set of one or more system states "$S_i$" that have similar performance. In the present invention no assumptions are made about the performance metric "$U(S_i)$"; it is only assumed that given two different levels of performance, "a" and "b," it is possible to determine whether level "b" is as good as, or better than, level "a" (we denote this condition as "$b \geq a$"). The present invention will thus achieve a comparison condition for the performance levels if each one of them is a scalar value.

In the example above, we used the single scalar value of "IO/s" as a simple example of one employable performance metric. It is also possible to implement the invention with richer forms of performance metrics. For example, if the composite performance metric contains two values (say bandwidth "w" and latency "1"), then a comparison performance metric can be straightforwardly defined as the pair (w,1), where (w,1)$\geq$(w',1') if and only if $w \geq w'$ and $1 \leq 1'$. Any arbitrary number of scalar metrics can be composed in this way. It will also be apparent to one skilled in the art that there are a great many other possible ways of doing this comparison between multiple scalar metrics.

Performability specifications are provided as a set of pairs, each pair comprising:

(1) a performance requirement (for the example system shown in FIG. 1, this might be measured in number of IO requests per second that complete with less than a given response time);

(2) the fraction of the time the associated performance level is acceptable.

For example, a performability specification might require 50 IO/s or more at least 40% of the time; and 10 IO/s or more for at least 80% of the time.

More formally, the target-system designer provides the multi-part performability requirement, defined by "n" pairs of numbers $(r_1, f_1), (r_2, f_2), \ldots (r_n, f_n)$, where "n" is any positive integer, with the properties $r_1 > r_2 > r_3 > \ldots r_n$, and $f_1 < f_2 < f_3 < \ldots f_n < 1$, where each "r" denotes a performance level (e.g., 50 IO/s), and the corresponding "f" denotes the fraction of the system's lifetime during which it delivers performance "r" or better.

A system is said to fulfill the target-system designer's multi-part performability requirement if for each performance level "$r_i$," where i=1, ..., n, there are sufficient number of possible system states where the system delivers performance level "$r_i$" or better, and they occur for a sufficient portion of the time. In other words, we need to determine whether the sum of the probabilities of all states that deliver performance level "$r_i$" or better is greater than or equal to "$f_i$", the probability of being in a state where the system needs to deliver performance level $r_i$ or better in the specified performability requirement.

More formally, a system can fulfill the target-system designer's multi-part performability requirement if:

$$\sum_{i=1}^{M} OP(S_i) 1(U(S_i) \geq r_j) \geq f_j, \quad \text{for} \quad j = 1, \ldots, n \quad \text{(Equation 2)}$$

The indicator function "1(e)" in Equation 2 is equal to one if the expression "e" is true and zero otherwise.

The goal of this invention is to efficiently determine whether Equation 2 holds.

Multi-Part Performability—General:

The detailed computing of a multi-part performability assessment will now be described. It will use as an example the multi-part performability requirements illustrated in FIG. 2 and a very simple candidate system that can be in one of only three failure scenarios during its operation as follows: (1) system down, 10% of the time, (2) at least 70 IO/s 60% of the time, and (3) fully functional at 100 IO/s 30% of the time.

Figure 3:
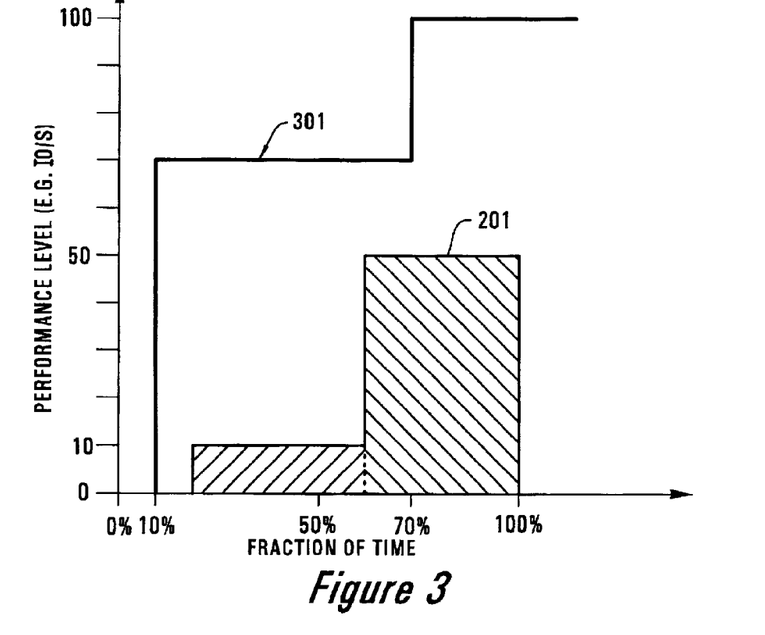
FIG. 3 is a graph depicting target-system designer predetermined performability requirements as shown in FIG. 2 and multi-part performability assessment results as determined in accordance with the present invention for an exemplary system in which the system satisfies the requirements.

Turning to FIG. 3, in accordance with the exemplary embodiment of the present invention, a "multi-part performability curve" 301 is computed and plotted in comparison against the "multi-part performability requirement curve" 201. Note that at all times, for this example, the multi-part performability curve 301 is above the requirements curve 201. Therefore, the proposed system satisfies the target-system designer's multi-part performability requirements. Any cross-over between the multi-part performability curve 301 and requirements curve 201 indicates a failure to meet the need with the specified system; see for comparison the example in FIG. 3A.

Figure 4:
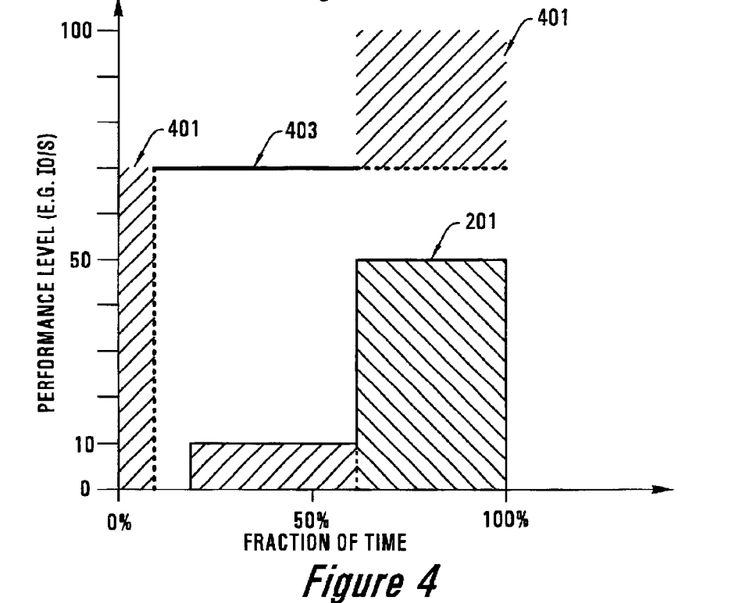
FIG. 4 is a graph representing target-system designer predetermined performability as shown in FIG. 3, for an exemplary system where multi-part performability does not need to be evaluated in particular operational regions, depicting a particular result of a multi-part performability assessment.

For a complex system, however, calculating all the possible states is virtually impossible or at least very expensive. A system having a thousand independent components, each of which can be digitally described as either "WORKING" ("1") or "FAILED" ("0"), has in principle $2^{1000}$ failure-scenarios. Using a performance evaluator on each of the millions of millions of states is impracticable with state of the art computing systems. Instead, various optimizations are applied in the present invention to reduce the number of states to an acceptable level for analysis. To achieve this, the present invention takes advantage of existing information. For example, the manufacturer of a disk array may provide specifications that indicate that the disk array will be in a "failed" state no more than 10% of the time, as shown in FIG. 4 with shaded area 401. Similarly, the manufacturer may provide guarantees about the portion of the time that the system is fully operational at 100 IO/s (FIG. 4, shaded area 402). The failure scenario generator 502 may take advantage of this to generate as the first two scenarios a "fully operational" scenario and a "failed" scenario, each with the corresponding probability specified by the manufacturer. The failed scenario may cover a number of states, each corresponding to a set of component failures that render the device unusable. Similarly, the fully operational scenario might cover a number of states in which the component failures do not affect the device performance (for example, in a device with dual redundant power supplies, the device might deliver full performance even with one power supply failed). Using these pre-aggregated, pre-defined, failure scenarios reduces the number of states remaining to be considered and therefore the time required for the analysis. Note that if this existing information is not available, the method described here still works, but may need to analyze more failure scenarios.

Figure 5:
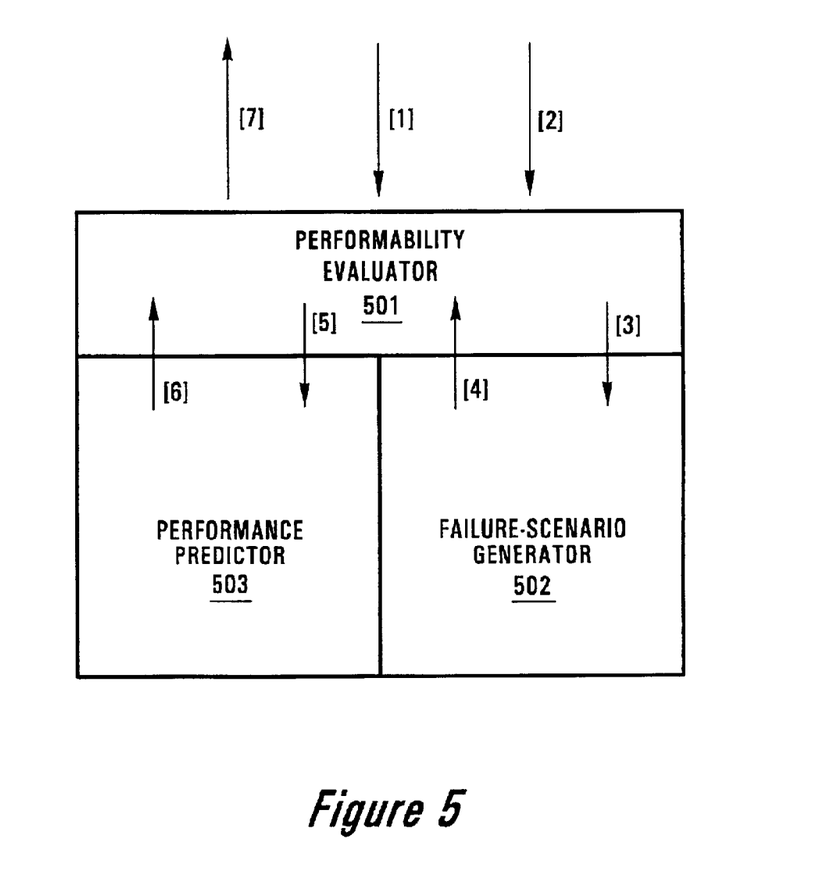
FIG. 5 is a block diagram of an architecture to evaluate multi-part performability in accordance with the present invention.

Multi-Part Performability Evaluator:

FIG. 5 is a block diagram of multi-part performability assessment, or evaluation, architecture 500 in accordance with the present invention. Three subsystems (computer code routines or modules) are provided:

a performability evaluator 501, a failure-scenario generator 502, and a performance predictor 503.

Failure-Scenario Generator 502:

The failure-scenario generator 502 takes as input, represented by an arrow labeled [3], the description of a candidate system and generates pairs ($sc_i$, $p_i$) (represented by the arrow labeled [4]). Each "$sc_i$" is a failure scenario, and corresponds to one or more system states "$S_i$". Each state corresponds to the system with zero or more components marked as failed. Next, "$p_i$" is the estimated fraction of time during that the input system will be in one of the states in failure scenario "$sc_i$".

Many computation methods are known in the art for calculating the probability of a particular state. A variety of implementations can be employed in accordance with the present invention. In the main, a failure-scenario generator is an algorithm generating a set of successive failure scenarios: $sc_1$, $sc_2$ ... $sc_i$ ... $sc_n$, where $sc_1$=current scenario.

Each failure scenario consists of one or more failure states, each failure state being representative of a failure mode in which one or more critical components of the system has failed. Each failure scenario "$sc_i$" has an occurrence probability "$p_i$", that is computed by the failure-scenario generator.

Failure states can be grouped into failure scenarios in a variety of ways. In accordance with the preferred embodiment of the present invention, failure scenarios are generated in approximate order of decreasing likelihood (i.e. the multi-part performability assessment will start with most likely failure scenarios). This avoids unnecessary computations by concentrating the assessment efforts on the states that carry more weight in the multi-part performability calculation. Each failure scenario can then be analyzed more intensively to determine whether end-user or target-system designer predefined multi-part performability requirements are satisfied.

The failure scenario generator can be "monolithic", in the sense that it is designed expressly for the particular kind of target system under analysis, or it can be "synthesized", in the sense that it is constructed using knowledge of the components and their relationships, and their predetermined failure data. This information can be exploited using any of several well-known mechanisms in the literature of system failure analysis, such as Markov models.

One possible optimization is enabled by the introduction of "macro-components": families of individual components that can be treated as a single entity for failure-scenario analysis.

For example, if a disk array uses 3-way mirroring across three identical disk drives, then the failure of any single one of those three disk drives has the same probability of occurrence, and the same impact on performance. This means that the failure-scenario generator 502 may therefore generate a single failure scenario instead of three similar ones, for improved efficiency. More formally, this is equivalent to grouping a set of similar states "$S'_1, \ldots, S'_b$" together in the same "($sc_i$,$p_1$)" pair, where "$sc_i$" would be any of the grouped states "$S'_1, \ldots, S'_b$", and "$p_i$" would equal "$OP(S'_1)) + \ldots + OP(S'_b)$", the probability that any of them occurs. This grouping optimization can greatly decrease the number of failure scenarios to be examined; it can be applied when either many states have the same performance, or when the error introduced by grouping is negligible (e.g., when very unlikely states get ignored as a consequence of grouping). Practical systems often have considerable symmetries in their designs; symmetries are a major source of opportunities for grouping. For example, when multiple similar subsystems contain similar data, they can be considered as indistinguishable for multi-part performability evaluation purposes. Thus, the failure-scenario generator may generate all states where a given number of indistinguishable components comprising the subsystems fail at the same time as a single failure-scenario. For the example, the same data may be replicated onto multiple disks in an LU, so the failure of any one of the disks has the same impact on multi-part performability. Or, if the system hardware is recognized to be approximately symmetrical, extrapolation of the data from one failure mode can be employed. Independently of this, each invocation of the generator 502 may return one or more ($sc_i$,$p_i$) pairs, depending on implementation decisions.

Failure scenarios may be generated in any order, as long as failure scenarios covering every state are eventually generated. Any failure-scenario generator that satisfies this property, such as one that generates failure scenarios in random or pseudo-random order, can be used in accordance with the present invention. For all but the smallest systems, however, generating the failure scenarios in random order is impractical, because there are too many unimportant failure scenarios. The implementation in a preferred embodiment of the present invention generates failure scenarios in approximate decreasing order of occurrence probability (in which the pairs with the highest value of "p" are generated first). Because of this property, the multi-part performability evaluator 501 considers as few failure scenarios as possible before making a decision on whether the system satisfies the multi-part performability requirements.

The following is a description of a specific implementation for the present invention of a heuristic program that will efficiently generate failure scenarios, each consisting of a single state. Let "FP(c)" denote the "failure probability" of system component "c"—that is, the likelihood that the system component "c" is not operating correctly (equivalently, this is (1−A(c)), where "A(c)" is the availability of component "c"—the fraction of the time that the component is in a correct, functioning state.) That information can be obtained from manufacturer's specifications and from the average time required to repair or replace the component after it fails (a procedure that typically involves human intervention) using well-known techniques in the art. For simplicity, the program generates exactly one $(sc_i, p_i)$ pair per invocation, and that pair corresponds to one system state "$S_i$":

(1) Let "D" represent a failure-free system;
(2) Let "$c_1, c_2 \ldots c_{mf}$" be components that can fail independently in "D";
(3) Let "sf" be the number of concurrent failures being considered in the last invocation (initially 0);
(4) Let "s" be the ordinal number, among the scenarios with exactly "sf" failures, of the scenario returned in the last invocation (initially 0);
(5) If there exist exactly "s" scenarios with "sf" concurrent failures, then sf=sf+1; s=0;
(6) If sf≦mf, then s=s+1, otherwise exit [no failure scenarios left for consideration];
(7) choose "$a_1, a_2 \ldots a_{sf}$" (where $a_i$, i=1, ... sf are different integers between 1 and mf) such that there are exactly "s−1" scenarios with "sf" concurrent failures more likely to occur than "$c_{a1}, c_{a2} \ldots c_{asf}$" [i.e., pick the "$s^{th}$" most likely scenario with "sf" concurrent failures];
(8) set sc=D with components $c_{a1}, c_{a2} \ldots c_{asf}$ marked as failed [construct representation of failure-scenario];
(9) set p=FP($c_{a1}$) x FP($c_{a2}$) x ... x FP($c_{a(sf)}$) x (1−FP($c_{b1}$))x ... x (1−FB($c_{b(mf-sf)}$)), where $C_{b1}, \ldots C_{b(mf-sf)}$ are all the components that did not fail in "sc" [compute probability for scenario "sc"]; and
(10) return (sc,p).

Performance Predictor 503:

There exist well-known techniques for implementing a performance predictor 503; the techniques used are typically tightly tied to the particular application domain. One type of known manner performance prediction is described in the Lee and Katz article, supra.

In essence, the performance predictor takes as input, represented by an arrow labeled [5] a failure scenario (such as the sc in the current $(sc_i, p_i)$ output of 502) and a workload description. The performance predictor returns the predicted performance of the workload under the current input failure scenario, represented by an arrow labeled [6], possibly under a workload that may also be communicated to the performance predictor. Other such known manner performance predictor modules may be adapted and employed in accordance with the present invention.

Multi-part Performability Evaluator 501:

This section details the method for determining whether a multi-part performability requirement can be met by the target system. The techniques presented hereinafter can also be used to allow target-system designers to specify independent performability requirements for independent pieces of data in the input workload.

Figure 6:
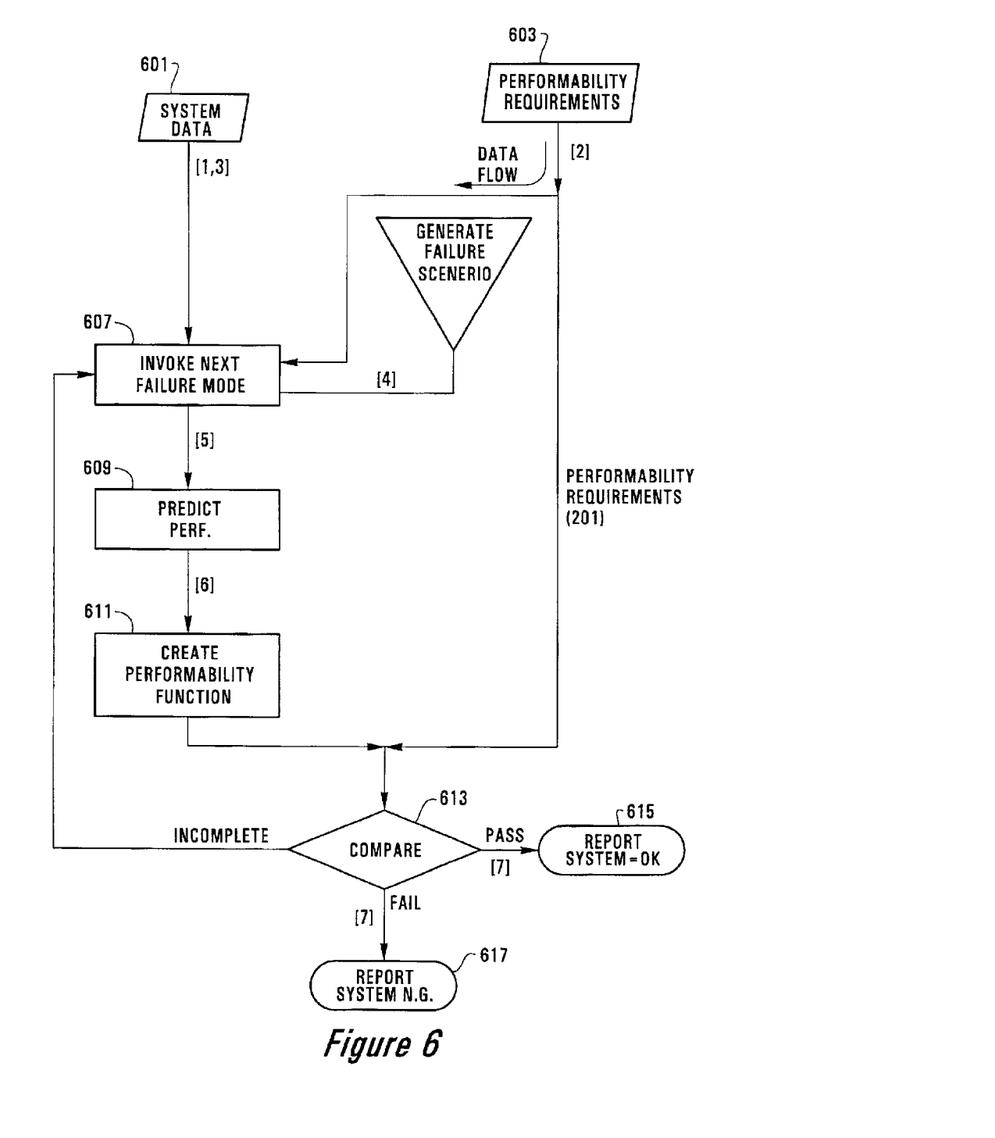
FIG. 6 is a flow chart illustrating the methodology performed in accordance with the present invention.

Turning now also to FIG. 6, calculations using the multi-part performability evaluator 501 to predict whether a multi-part performability requirement is satisfied in accordance with the present invention are made in conjunction with the failure-scenario generator 502 and performance predictor 503. In general, the calculation is run only until a system-wide PASS-FAIL conclusion can be accurately reported, namely, as quickly as possible.

There are two inputs to this process. The first input data 601, represented in FIG. 5 by an arrow labeled [1], is a system description for the system configuration being considered. For example, in analyzing the exemplary system in FIG. 1, the system description comprises components including controllers, cache memory, busses, arrays of disk drives, and appropriate interface devices. For simplicity of explanation, host computer 111, 111' failures are ignored. Each component has a supplied, predicted failure rate (perhaps supplied by its manufacturer)—typically expressed as the annual failure rate (AFR) or its inverse, the mean time before failure (MTBF). The other input data 603, represented in FIG. 5 by an arrow labeled [2], is the target-system designer specified multi-part performability specifications. It may also include workload information.

Again using FIG. 1 and the previously described example system 100, the predefined multi-part performability specification can include minimal levels of performance that the target system needs to satisfy and the fraction of the time a particular performance level is acceptable, curve 201, FIG. 2. In addition, it can include descriptions of the workload demands that will be put on the target system (for example, average request rate in IO/s, mean IO request size, average number of requests that are sequential in LU address space, as described hereinbefore). The workload parameters are preferably encoded in a compact, computer-readable form.

Next, the multi-part performability evaluator 501 invokes the failure-scenario generator 502, step 607, represented in FIG. 5 by an arrow labeled [3]. The failure-scenario generator 502 returns the first failure scenario, namely the $(sc,p)_N$ pair representative of the approximately most likely failure. Note that more than one (sc,p) pair may be returned.

These first-cut failure-scenarios are evaluated one-by-one by the performance predictor 503, step 609. The inputs to step 609, represented in FIG. 5 by an arrow labeled [5], are the failure scenario under consideration and the workload parameters (input to the system in the flow represented in FIG. 5 by an arrow labeled [2]). For each (sc,p) pair, the performance predictor 503 returns an estimation (represented in FIG. 5 by an arrow labeled [6]) of the performance the workload would achieve in the system configuration being considered if the failures (if any) in the current failure scenario "sc" had occurred. Per the exemplary embodiment, the return value may be in the form of the average number of IO/s for the current degraded operational state under consideration.

One advantage of the present invention is that availability and performance calculations are decoupled and done independently; first, determining which failure scenarios are relevant to the analysis and how likely they are to occur, and second, computing performance predictions only for the relevant failure scenarios.

Next, step 611, the multi-part performability evaluator 501 creates a multi-part performability function (expressed as a curve in FIG. 3, 301). That is, the data returned [6] from the performance predictor 503 is converted to a format compatible with comparison to the target-system designer's multi-part performability requirements [2].

In FIG. 4, for example, the segment 403 of the derived candidate system's multi-part performability curve (analogous to curve 301, FIG. 3 and 301', FIG. 3A) corresponds to a single failure scenario. By incrementally building the multi-part performability curve of the candidate system configuration, partial results are combined in a way that is accurate and avoids unnecessary computations.

Figure 3A:
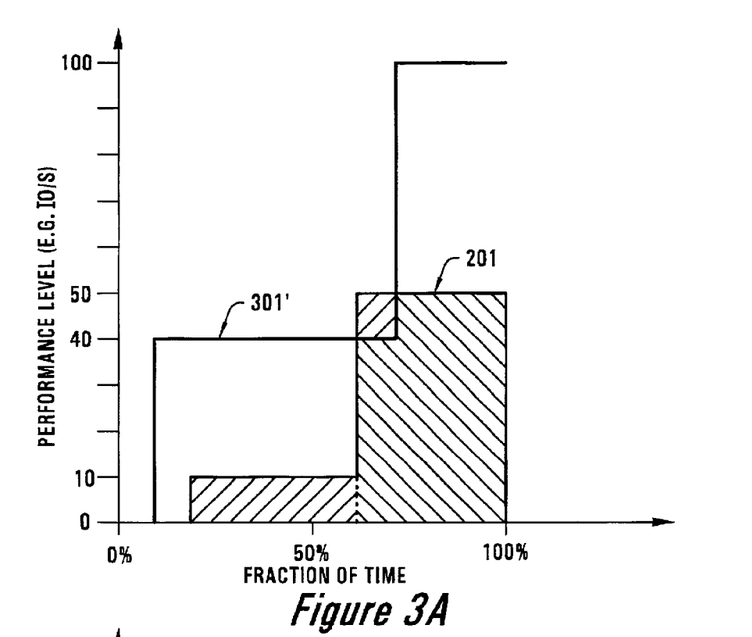
FIG. 3A is a graph combining depicting target-system designer predetermined performability requirements as shown in FIG. 2 and multi-part performability assessment results as determined in accordance with the present invention for an exemplary system that does not satisfy the requirements.

The multi-part performability function produced by step 611 and the multi-part performability requirement function in input data 603 are then compared, step 613. In other words, a determination is made as to whether any curve crossing has occurred (see e.g., FIG. 3 versus FIG. 3A, described above). The following process steps describe one way in which this comparison can be performed; those skilled in the art will recognize that other ways of achieving this comparison are possible:

(1) set i=1;
(2) generate the next state "$S_i$" and its occurrence probability "$OP(S_i)$", using a failure-scenario generator 502 (supra);
(3) compute "$U(S_i)$" using a performance predictor module 503 (supra);
(4) if, $$\sum_{k=1}^{i} OP(S_k) 1(U(S_k) \geq r_j) \geq f_j, \quad \text{for all} \quad j = 1, 2, \ldots n,$$

then the system satisfies the multi-part performability requirements (in other words no curve crossing can occur; see e.g., FIG. 3), exit and report; or (5) if, $$\sum_{k=1}^{i} OP(S_k) 1(U(S_k) < r_j) \geq 1 - f_j, \quad \text{for all} \quad j = 1, 2, \ldots n,$$

then the system fails the multi-part performability requirements (in other words a curve crossing has occurred; see e.g., FIG. 3A), exit and report; otherwise, (6) set i=i+1 and go to step (2).

The results of the comparison, step 613, may be that the analysis is incomplete, namely, the failure scenarios considered so far were insufficient to make a decision, in that case the process loops to the next logical failure scenario for consideration. In other words, it should be recognized that it may take a number of loops of the process through multiple failure-scenarios before computing a multi-part performability function that is sufficient to make a definite decision. If the multi-part performability function is detailed enough to ascertain whether the end user or target-system designer's multi-part performability requirements are satisfied, a report issues that the system passed, 615 (see FIG. 3) or failed 617 (see FIG. 3A).

FIG. 4 shows an example in which only a portion of the candidate system's multi-part performability curve 403 must be generated before reaching a decision, provided that the relevant failure scenario(s) is examined as early as possible in the process. Since the requirement curve 201 calls for at most 20% downtime and segment 403 implies that downtime is 10% or less, it is not necessary to further refine the analysis of area 401 of the graph. Analogously, if it is known (e.g., because of the number of failures) that all failure scenarios with performance levels lower than segment 403 fall into area 401, there is no need to further examine area 402 either. Accordingly, computing the performance prediction for the single failure scenario corresponding to segment 403 is enough to determine that the system satisfies the requirements.

Depending on the particular system to be analyzed in accordance with the present invention, the performability evaluator 501 may determine whether given multi-part performability requirements are satisfied without evaluating all failure scenarios generated by the failure-scenario generator 503. For example, a particular requirements curve 201 may only require 50 IO/s with 40% availability and 10 IO/s with 80% availability. When enough failure scenarios to account for the 40% availability at 50 IO/s and 80% availability at 10 IO/s or better have been analyzed, additional scenarios do not have to be evaluated; in other words, it is not necessary to spend the additional effort to analyze the behavior of the system for the remaining 20% of the time.

Unlike prior solutions, the method of the present invention does not require building a model of an entire solution (although providing an option to do so) and incurring the computational effort and delay of estimating the performance of system states that will not be relevant to the final analysis. The ordering heuristic used in the proposed preferred embodiment of the failure-scenario generator 502 has the goal of analyzing only as many failure scenarios as necessary.

In summary, given a multi-component system and a multi-part performability requirement for it, the present invention generates an accurate determination of whether the system will fulfill the multi-part performability requirements. Said determination is rapidly generated by modest computational means.

The foregoing description of the preferred embodiment of the present invention has been presented for purposes of illustration and description. It is not intended to be exhaustive or to limit the invention to the precise form or to exemplary embodiments disclosed. Many modifications and variations will be apparent to practitioners skilled in this art. For example, the present invention can be readily adapted to the analysis of other complex system candidates such as for computer-printer networks, telecommunications networks, and the like, or even for fields outside computer-based systems. Similarly, any process steps described might be interchangeable with other steps in order to achieve the same result. The disclosed embodiment was chosen and described in order to best explain the principles of the invention and its best mode practical or preferred application, thereby to enable others skilled in the art to understand the invention for various embodiments and with various modifications as are suited to the particular use or implementation contemplated. It is intended that the scope of the invention be defined by the following claims and their equivalents. Reference to an element in the singular is not intended to mean "one and only one" unless explicitly so stated, but can mean "one or more." Moreover, no element, component, nor method step in the present disclosure is intended to be dedicated to the public regardless of whether the element, component, or method step is explicitly recited in the claims.

What is claimed is:

1. A method of determining whether a multi-component target system meets a given multi-part performability requirement, the method comprising:

obtaining a description of the target system and failure probabilities for components of the target system that can fail independently, obtaining a multi-part performability requirement for the target system, the multi-part performability requirement indicating desired performance levels for the target system and corresponding fractions of time, producing a first failure-scenario of said target system using a computer-implemented failure scenario generator module that receives as input the target system description and the failure probabilities, the first failure-scenario comprising one or more states of the target system having zero or more components failed and a corresponding probability of occurrence of the one or more of the states of the target system, modeling performance of the target system under the first failure scenario using a computer-implemented performance predictor module for generating a multi-part performability function of said target system, the performance predictor module receiving as input said first failure-scenario, comparing said multi-part performability function with said multi-part performability requirement, and determining from said comparing whether said target system meets said multi-part performability requirement.

2. The method as set forth in claim 1, the step of comparing further comprising:

calculating if said first failure-scenario provides sufficient data for generating a multi-part performability function determinative of target system performance capability when compared to said multi-part performability requirements, and if so, proceeding with said step of determining, or if not repeating said steps of producing, generating, comparing, and calculating for successive next failure-scenarios until sufficient data is obtained for generating a multi-part performability function determinative of said target system performance capability when compared to said multi-part performability requirements.

3. The method as set forth in claim 1, performance predictor module also receiving as input a workload description.

4. The method as set forth in claim 1, the step of producing comprising:

synthesizing a model of the target system based on predetermined individual components of the target system wherein each of said components has a characteristic failure specification.

5. The method as set forth in claim 4, further comprising the steps of:

combining components of the target system as a macro-component;

computing the failure probability of the macro-component as a function of the failure probabilities of its respective components; and using macro-components in said computing.

6. The method as set forth in claim 1, wherein the step of producing is performed in accordance with the following:

let "FP(c)" denote a probability that a system component "c" of the target system will fail; then, (1) Let "D" represent a failure-free system;

(2) Let "$c_1, c_2 \ldots c_{mf}$" be components that can fail independently in D;

(3) Let "sf" be the number of concurrent failures being considered in the last invocation (initially 0);

(4) Let "s" be the ordinal number, among the scenarios with exactly "sf" failures, of the scenario returned in the last invocation (initially 0);

(5) If there exist exactly "s" scenarios with "sf" concurrent failures, then sf=sf+1; s=0;

(6) If sf≦mf, then s=s+1, otherwise exit;

(7) choose $a_1, a_2 \ldots a_{sf}$ (where $a_i$, i=1, ... sf are different integers between 1 and mf) such that there are exactly "s−1" scenarios with "sf" concurrent failures more likely to occur than $c_{a1}, c_{a2} \ldots c_{asf}$;

(8) set sc=D with components $c_{a1}, c_{a2} \ldots c_{asf}$ marked as failed;

(9) set p=FP($c_{a1}$) x FP($c_{a2}$) x ... x FP($c_{a(sf)}$) x (1−FP($c_{b1}$)) x ... x (1−FB($c_{b(mf-sf)}$)), where $c_{b1}, \ldots C_{b(mf-sf)}$ are all the components that did not fail in "sc"; and (10) return (sc,p).

7. The method as set forth in claim 2, further comprising:

grouping states together wherein said target system is non-functional, and representing the grouped states in the multi-part performability function.

8. The method as set forth in claim 2, further comprising:

grouping states together wherein the target system is fully functional; and representing the grouped states in the multi-part performability function.

9. The method as set forth in claim 2, wherein the failure-scenarios are computed according to an order of likelihood of occurrence.

10. The method as set forth in claim 9, comprising:

if a multiplicity of like components having like failure probability and effect are employed within said target system, treating said multiplicity of like components as a single component of said target system.

11. The method as set forth in claim 2, wherein repeating the steps of producing, generating, comparing, and calculating for successive next failure-scenarios is performed in accordance with the following:

(1) set i=1;

(2) generate the next state $S_i$ and its occurrence probability $OP(S_i)$;

(3) compute the performance $U(S_i)$ using the performance predictor module; and (4) if, $$\sum_{k=1}^{i} OP(S_k) 1(U(S_k) \geq r_j) \geq f_j, \quad \text{for all} \quad j = 1, 2, \ldots n,$$

then the target system is capable of fulfilling the multi-part performability requirements, exit and report; or (5) if, $$\sum_{k=1}^{i} OP(S_k) 1(U(S_k) < r_j) \geq 1 - f_j, \quad \text{for any} \quad j = 1, 2, \ldots n,$$

then the target system fails the multi-part performability requirements, exit and report; and otherwise, (6) set i=i+1 and go to step (2).

12. A computer readable media comprising computer code for implementing a method of determining whether a multi-component target system meets a given multi-part performability requirement, the method comprising the steps of:
producing a first failure-scenario of said target system, the first failure-scenario comprising one or more states of the target system having zero or more components failed and a corresponding probability of occurrence of the one or more of the states of the target system;
modeling performance of the target system under the first failure scenario for generating a multi-part performability function;
comparing said multi-part performability function with said multipart performability requirements; and
determining from said comparing whether said target system has a capability of performing said multi-part performability requirements.

13. The media as set forth in claim 12, further comprising computer code for:
calculating if said first failure-scenario provides sufficient data for generating a multi-part performability first function determinative of predicting multi-part performability when compared to said multi-part performability requirements, and
if so, proceeding with said step of determining; or
if not,
repeating the steps of producing, generating, comparing, and calculating for successive next failure-scenarios until sufficient data is obtained for generating a multi-part performability function determinative of the target system performance capability when compared to the multi-part performability requirements.

14. The media as set forth in claim 13, further comprising computer code for:
grouping states together wherein said target system is non-functional; and
grouping states together wherein said target system is fully functional in accordance with said performance requirements.

15. The media as set forth in claim 14,
wherein failure-scenarios are computed according to an order of likelihood of occurrence.

16. A computer system for determining whether a multi-component target system meets a given multi-part performability requirement, comprising:
a failure scenario generator module for producing a first failure-scenario of the target system from a description of the target system and failure probabilities for components of the target system that can fail independently, the first failure-scenario comprising one or more states of the target system having zero or more components failed and a corresponding probability of occurrence of the one or more of the states of the target system,
a performance predictor module for modeling performance of the target system under the first failure scenario wherein a multi-part performability function of the target system is generated from the performance predicted for the target system, the performance predictor module receiving as input the first failure-scenario, and
a performability evaluator module for comparing the multi-part performability function with a multi-part performability requirement for the target system, the multi-part performability requirement indicating desired performance levels for the target system and corresponding fractions of time, and for determining from the comparison whether the target system meets the multi-part performability requirement.

17. The computer system as set forth in claim 16, wherein the performability evaluator module determines whether the first failure-scenario provides sufficient data for generation of a multi-part performability function determinative of target system performance capability when compared to the multi-part performability requirements, and
if so, the performability evaluator module proceeds with determining from the comparison whether the target system meets the multi-part performability requirement, or
if not, successive next failure-scenarios are evaluated until sufficient data is obtained for generating a multi-pan performability function determinative of the target system performance capability when compared to the multi-part performability requirements.

18. The computer system as set forth in claim 16, wherein the performance predictor module also receives as input a workload description.

19. The computer system as set forth in claim 16, wherein the performance predictor synthesizes a model of the target system based on predetermined individual components of the target system wherein each of said components has a characteristic failure specification.

20. The computer system as set forth in claim 16, wherein components of the target system are combined as a macro-component and the failure probability of the macro-component is computed as a function of the failure probabilities of its respective components.

21. The computer system as set forth in claim 16, wherein the failure scenario generator operates in accordance with the following:
let "FP(c)" denote a probability that a system component "c" of the target system will fail; then,
(1) Let "D" represent a failure-free system;
(2) Let "$c_1, C_2 \ldots c_{mf}$" be components that can fail independently in D;
(3) Let "sf" be the number of concurrent failures being considered in the last invocation (initially 0);
(4) Let "s" be the ordinal number, among the scenarios with exactly "sf" failures, of the scenario returned in the last invocation (initially 0);
(5) If there exist exactly "s" scenarios with "sf" concurrent failures, then sf=sf+1; s=0;
(6) If sf≦mf, then s=s+1, otherwise exit;
(7) choose $a_1, a_2 \ldots a_{sf}$ (where $a_i$, i=1, ... sf are different integers between 1 and mf) such that there are exactly "s−1" scenarios with "sf" concurrent failures more likely to occur than $c_{a1}, C_{a2} \ldots c_{asf}$;
(8) set sc=D with components $c_{a1}, c_{a2} \ldots c_{asf}$ marked as failed;
(9) set p=FP($c_{a1}$) x FP($c_{a2}$) x ... x FP($c_{a(sf)}$) x (1−FP($c_{b1}$)) x ... x (1−FB($c_{b(mf-sf)}$)), where $c_{b1}, \ldots C_{b(mf-sf)}$ are all the components that did not fail in "sc"; and (10) return (sc,p).

22. The computer system as set forth in claim 16, wherein states are grouped together in which the target system is non-functional, and the grouped states are represented in the multi-part performability function.

23. The computer system as set forth in claim 16, wherein states are grouped together in which the target system is fully functional, and the grouped states are represented in the multi-part performability function.

24. The computer system as set forth in claim 16, wherein the failure-scenarios are computed according to an order of likelihood of occurrence.

25. The computer system as set forth in claim 24, wherein if a multiplicity of like components having like failure probability and effect are employed within the target system, the multiplicity of like components are treated as a single component of the target system.

26. The computer system as set forth in claim 16, wherein the computer system operates in accordance with the following:

(1) set i=1;

(2) generate the next state $S_i$ and its occurrence probability $OP(S_i)$;

(3) compute the performance $U(S_i)$ using the performance predictor module; and (4) if, $$\sum_{k=1}^{i} OP(S_k) 1(U(S_k) \geq r_j) \geq f_j, \quad \text{for all} \quad j = 1, 2, \ldots n,$$

then the target system is capable of fulfilling the multi-part performability requirements, exit and report; or (5) if, $$\sum_{k=1}^{i} OP(S_k) 1(U(S_k) < r_j) \geq 1 - f_j, \quad \text{for any} \quad j = 1, 2, \ldots n,$$

then the target system fails the multi-part performability requirements, exit and report; and otherwise, (6) set i=i+1 and go to step (2).

* * * * *